Patented Nov. 27, 1951

2,576,515

UNITED STATES PATENT OFFICE 2,576,515

POLYMERIZATION OF VINYLCYCLOHEXENE

Herbert L. Johnson, Media, and Archibald P. Stuart, Norwood, Pa., assignors to Sun Oil Company, Philadelphia, Pa., a corporation of New Jersey No Drawing. Application March 18, 1948, Serial No. 15,744

2 Claims. (Cl. 260—666)

This invention relates to the preparation of novel polymers of 4-vinylcyclohexene. Specifically, the invention relates to a process for the polymerization of 4-vinylcyclohexene to form novel polymer products which have a molecular weight exceeding that of the dimer product of 4-vinylcyclohexene. Still more specifically, the invention relates to a process in which a fairly viscous oil-like polymer, as defined more fully below, can be prepared.

According to the present invention there is provided a process for the preparation of fairly viscous oil-like polymers which comprises subjecting 4-vinylcyclohexene to polymerizing conditions in the presence of a polymerizing agent selected from the group consisting of boron fluoride ether complexes, sulfuric acid and stannic chloride for a time sufficient to cause the polymerization.

The polymerization to the above mentioned oil-like product is to be effected at a temperature within the range 35° C.–130° C. The particular temperature chosen will depend upon the specific catalyst employed and upon the nature of the specific product desired, it being within the scope of this invention to prepare products differing from one another to some extent.

The temperature of the reaction mass when a boron fluoride ether complex is employed as the catalyst understandably can be lower than that obtaining when sulfuric acid or stannic chloride are employed. Likewise the temperature when employing sulfuric acid can be lower than that obtaining when stannic chloride is employed.

The catalyst now preferred is boron fluoride ether complex and the temperature best suited to its use for the process of the invention has been found to be within the range 50° C.–75° C.

To aid the polymerization reaction and to facilitate agitation of the reaction mass, there can be employed with concomitant advantages a solvent; for example, petroleum ether or other solvent neutral to the conditions prevailing during the polymerization reaction. Usually from about 1–2 parts of solvent to one part of monomer will yield good results.

As stated, agitation of the reaction mass is essential to the formation of the desired product.

As the reaction progresses it is advisable to remove portions of the reaction mass, arrest the polymerization taking place therein and to recover the product to determine its properties, thus positively ensuring that the main portion of the reaction mass, when it is treated to recover the polymer therefrom, will contain a desirable product. Treating batches of about 200–225 grams of vinylcyclohexene the time to obtain the desired product will be about five hours. The time or extent of polymerization can be varied, particularly depending upon the exact nature of the product desired. In the event that the polymerization has been allowed to progress too far it is advisable to leave some of the dimer of vinylcyclohexene, a relatively small quantity of which is formed during the polymerization reaction, in the final product to adjust its viscosity to the particularly desired value. Of course, when the desired degree of polymerization is obtained, the dimer, together with solvent, can be removed by distillation.

By the term "fairly viscous oil-like polymer product" there is to be understood those polymers of 4-vinylcyclohexene, obtained by the steps of the present invention, and which usually have a viscosity in the neighborhood of 60 centistokes at 210° F. (98.9° C.). The viscosity determination is more difficult at lower temperatures than at that employed herein because of the rather highly viscous nature of the product at lower temperature. Thus at about 20° C. the material barely pours and is like heavy molasses.

The polymer product of this invention is useful in the compounding of paints and varnishes.

We claim:

1. The polymerization of 4-vinylcyclohexene to an oil-like polymer product having a viscosity of about 60 centistokes at 210° F. and a molecular weight exceeding that of the dimer of 4-vinylcyclohexene, which comprises contacting, at a temperature of from 35° C. to 130° C. for a time sufficient to cause polymerization to said polymer product, 4-vinylcyclohexene with a catalyst selected from the group consisting of boron fluoride ether complex, sulfuric acid, and stannic chloride, and separating said polymer product from the reaction mixture.

2. The polymer product prepared according to claim 1.

HERBERT L. JOHNSON.
ARCHIBALD P. STUART.

REFERENCES CITED

The following references are of record in the file of this patent:

UNITED STATES PATENTS

| Number | Name | Date |
|---|---|---|
| 2,182,617 | Michel | Dec. 5, 1939 |
| 2,470,175 | Linn | May 17, 1949 |

FOREIGN PATENTS

| Number | Country | Date |
|---|---|---|
| 343,116 | Great Britain | Feb. 16, 1931 |
| 596,008 | Great Britain | Dec. 24, 1947 |

OTHER REFERENCES

Zelinsky et al.: Chemical Abstracts, vol. 40, page 5025 (1946).